US010247385B2

(12) United States Patent
Thijssen et al.

(10) Patent No.: US 10,247,385 B2
(45) Date of Patent: Apr. 2, 2019

(54) LIGHTING DEVICE, LENS AND METHOD, HAVING A MIXING STRUCTURE WITH A VARIABLE BLURRING STRENGTH

(71) Applicant: SIGNIFY HOLDING B.V., Eindhoven (NL)

(72) Inventors: Johannes Maria Thijssen, Eindhoven (NL); Fabio Fornasa, Eindhoven (NL); Rusian Akhmedovich Sepkhanov, Eindhoven (NL); Inge Van De Wouw, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/570,428

(22) PCT Filed: May 11, 2016

(86) PCT No.: PCT/JP2016/060551
§ 371 (c)(1),
(2) Date: Oct. 30, 2017

(87) PCT Pub. No.: WO2016/184748
PCT Pub. Date: Nov. 24, 2016

(65) Prior Publication Data
US 2018/0156415 A1 Jun. 7, 2018

(30) Foreign Application Priority Data

May 20, 2015 (EP) ..................................... 15168365

(51) Int. Cl.
*F21K 9/60* (2016.01)
*F21K 9/62* (2016.01)
(Continued)

(52) U.S. Cl.
CPC .................. *F21V 5/04* (2013.01); *F21K 9/62* (2016.08); *F21V 5/002* (2013.01); *F21V 13/00* (2013.01);
(Continued)

(58) Field of Classification Search
CPC . F21V 5/002; F21V 5/04; F21V 13/00; F21V 14/06; F21K 9/62; G02B 5/02; G02B 5/0278
See application file for complete search history.

(56) References Cited

U.S. PATENT DOCUMENTS 8,613,530 B2 * 12/2013 Allen ..................... F21V 13/12
362/249.02
9,534,743 B2 * 1/2017 Allen ..................... F21V 13/12
(Continued)

FOREIGN PATENT DOCUMENTS

WO       0208799 A2    1/2002
WO     2007122459 A2   11/2007

*Primary Examiner* — Thomas M Sember

(57) ABSTRACT

The invention relates to a lighting device for issuing a light beam in a main direction along an optical axis. The lighting device comprises a light source and a positive, refractive lens provided on the optical axis, the lens being movable with respect to the light source over the optical axis. The lighting device further comprises a mixing structure provided on the optical axis and having an added blurring strength FWHM, with FWHM being in a range of 3° to 15°.

15 Claims, 7 Drawing Sheets

(51) Int. Cl.
| | |
|---|---|
| *F21V 5/00* | (2018.01) |
| *F21V 5/04* | (2006.01) |
| *G02B 5/02* | (2006.01) |
| *F21V 13/00* | (2006.01) |
| *F21V 14/06* | (2006.01) |
| *F21Y 101/00* | (2016.01) |
| *F21Y 115/10* | (2016.01) |

(52) U.S. Cl.
CPC ............... *F21V 14/06* (2013.01); *G02B 5/02* (2013.01); *G02B 5/0278* (2013.01); *F21K 9/60* (2016.08); *F21Y 2101/00* (2013.01); *F21Y 2115/10* (2016.08)

(56) References Cited

U.S. PATENT DOCUMENTS

| | | |
|---|---|---|
| 2010/0246175 A1 | 9/2010 | Nikolaus et al. |
| 2011/0170289 A1 | 7/2011 | Allen et al. |
| 2015/0124224 A1 | 5/2015 | Yamauchi et al. |

\* cited by examiner

LIGHTING DEVICE, LENS AND METHOD, HAVING A MIXING STRUCTURE WITH A VARIABLE BLURRING STRENGTH

CROSS-REFERENCE TO PRIOR APPLICATIONS

This application is the U.S. National Phase application under 35 U.S.C. § 371 of International Application No. PCT/EP2016/060551, filed on May 11, 2016 which claims the benefit of European Patent Application No. 15168365.3, filed on May 20, 2015. These applications are hereby incorporated by reference herein.

FIELD OF THE INVENTION

The invention relates to a lighting device comprising a light source for issuing light in a main direction along an optical axis and a lens provided on the optical axis. The invention further relates to a lens and a method to obtain a desired or required quality of a light beam.

BACKGROUND OF THE INVENTION

Nowadays spot lighting devices are applied largely in retail lighting and museum lighting. The light distribution is mainly defined by the light source and the optical solution, i.e. an optical part, such as a reflector, TIR-collimator or lens. Each optical solution has its own properties, advantages and disadvantages and the choice for the optical architecture largely depends upon the requirements of the application.

A TIR-collimator, for example, is a solution with high optical efficiency and reasonable control on the light distribution, but it cannot make a variable beam width. A reflector can be a solution with good optical efficiency for wider beams, but due to the direct light, it usually doesn't show a clear cut-off in the light distribution. To a certain extent, this can be improved by a deep reflector or by shielding the direct light, but this will reduce efficiency and very narrow beams still remain challenging. Fresnel lenses tend to render less uniformity of light distributions because of the occurrence of diffraction at the edges of the refractive/reflective rings. Narrow beams with good intensity distribution can be made using a convex, positive lens, but has the disadvantages that it will show chromatic aberrations and a visible image of the light source. In addition, for example when a LED is used as the light source in combination with such a positive lens, the risk on a relatively low optical efficiency is increased, because some light from the Lambertian LED-source will not enter the lens, but it will be absorbed in the housing. The width of the beam can be modified by adjusting the distance between the lens and the LED.

SUMMARY OF THE INVENTION

In view of the known solutions from the prior art, each with their own disadvantage, there is a need for a lighting device which renders a beam width that can be varied from very narrow to wide, for example a beam of light issued within a virtual cone having an apex angle selected from the range of 5°-90°, for example 5°-40° or 8°-20°, while maintaining a relatively sharp, normal light intensity distribution and a relatively uniform color light distribution. Such a lighting device can serve a lot of applications, for example illumination of objects in shops or in museums with varying exhibitions of small and larger objects.

It is an object of the invention to provide a lighting device of the type as described in the opening paragraph and in which the beam width can be varied and in which at least one of the abovementioned disadvantages is counteracted. Thereto the lighting device of the type as described in the opening paragraph further features that the lens being movable with respect to the light source along the optical axis and that a mixing structure is provided on the optical axis having a bluffing strength FWHM being in a range of 3° to 15°, the bluffing strength of the mixing structure gradually and continuously increases with an increase in distance R in radial direction from the optical axis.

The invention preferably is used for spot lighting where the quality of light is very important, particularly in applications as museum lighting and high end retail lighting. The lighting device according to the invention offers a combination of a narrow beam, variable beam, excellent color uniformity, excellent intensity uniformity in rotational direction and excellent radial intensity profile. The mixing structure is used to reduce color artefacts caused by chromatic aberration and other artefacts as well. Towards the periphery of the lens, the light rays are bent sharper, so compensation for chromatic aberrations via bluffing is more important and therefore is somewhat stronger closer to the edges than in the center of the lens. The required bluffing strength depends on a number of parameters, such as lens material, lens geometry, source geometry and distance from the light source to the lens. In general the mixing structure causes the phenomena of both increased vagueness and beam broadening. Vagueness is desired as it removes color aberration and imaging of the light source on the projection surface, beam broadening is not desired as this limits the range of beam width control of the lighting device and it often involves a decrease in sharp cut-off of the beam edge. Hence, an appropriate setting for these two conflicting phenomena has to be chosen.

Preferably, the blurring strength of the mixing structure increases in radial direction from the optical axis by at least a factor 1.1, for example a factor 1.25, to adequately deal with this effect, but preferably less than a factor 1.6 to avoid too unsharp edges of the beam and/or broadening of the beam. Just as an example, a lens with an added blurring strength by the mixing structure of 5° FWHM in the center, then preferably has a bluffing strength at the edge of the lens in the range of 5.5° to 9° FWHM.

The bluffing strength is determined as follows: as a starting point is taken a collimated bundle of (light) rays of a laser beam, i.e. a light beam having a full width at half maximum (FWHM) essentially of 0° (i.e. a laser beam). Said collimated beam of bundle of rays is to propagate through a mixing structure resulting in a spread of light of the beam into a bundle of slightly diverging light rays which are propagating into a virtual cone around a cone axis (which might coincide with the optical axis), the virtual cone having an apex angle in the range of 3° to 15°. Said spread of light from a bundle of rays in a collimated beam (with FWHM=0°) to the bundle of mutually diverging light rays in the spread beam is measured as FWHM and is defined as the bluffing strength of the mixing structure, i.e. in this invention in particular said bluffing strength is set to be in the range of 3° to 15° FWHM. The desired bluffing strength is obtainable by random micro-sized structures, for example a sandblasted surface, or by regular micro-sized geometrical structures, for example a tessellated surface of square pyramids. Micro-sized means a size in the range from 1 μm, i.e. at least well longer than the wavelength of visible light, to about 5000 μm, or preferably 1000 μm. Random structures in general are advantageous as they are relatively easy to make and render the bluffing strength to give a Gaussian shaped beam, with pleasant, smooth beam edge. When bluffing has a Gaussian distribution or profile, blurring strength can also be expressed in terms of Gaussian sigma or σ, wherein σ=FWHM/2.355. The bluffing can be different in transverse directions, i.e. in an x-direction the bluffing can be, for example, only 3°, while in the transverse y-direction the bluffing can be, for example, 12°, this independence on the desired beam pattern.

It appeared that in general a bluffing strength in the range of FWHM 3° to 15° will result in a beam having a normal intensity profile and having a uniform color distribution. Hence, for example in the case the light source is a LED, such a degree of scattering renders the lighting device to issue during operation a light beam of desired quality. In particular the lower limit value of 3° for the bluffing strength renders the beam to have an acceptably low degree of chromatic aberration, i.e. the chromatic aberration is just on or below a threshold level for being observable. In particular, when taking the CIE (u', v') chromaticity diagram as the color space, the color aberration within the beam is smaller than a circle with a radius of less than 0.0055 (u', v') in coordinates in said color space from the average color of the beam, which for most applications is a practically and acceptably low value. Preferably said radius is equal or less than 0.0013 (u', v') in coordinates, i.e. below a just noticeable chromaticity difference at 50% probability that color difference is not observed anymore by humans in the white region of the (u', v') diagram. When said radius is equal or less than 0.0011 in (u', v') coordinates, color differences are not observable anymore by humans. The higher the bluffing strength, the better the homogeneity of the beam with respect to absence of chromatic aberration and absence of Euclidian difference, i.e. the absence of the visibility of a light source image in the projected beam. However, blurring should not become too much. Hence, below the upper value of 15° of the bluffing strength, the light beam as issued by the lighting device can still be acceptably narrow for most applications.

Furthermore, bluffing should not be confused with diffuse scattering, as with diffuse scattering each location at which diffuse scattering occurs, will behave as a Lambertian light source and the relatively small etendue of the original primary light beam is increased. Yet, in the invention bluffing practically always includes a few percent of scattering, for example 5%, due to some surface roughness, internal irregularities or boundaries. In the invention diffuse scattering by the mixing structure is allowed to some extent, for example up to 25% of light impinging on the mixing structure may be diffusely scattered. In the case of a mixing structure, for example as obtained via sand-blasting or etching, there is a significant risk on a high amount of diffuse scattering. The amount of diffuse scattering by a sand-blasted or etched surface is, for example, to be controlled by the degree of sand-blasting/etching and by the density of the pattern thus obtained, i.e. the treated surface is only lightly sand-blasted/etched such that a significant part, for example at least 75%, of impinging light on the mixing structures remains unaffected and propagates along its original path. Diffuse scattering by the mixing structure is easier to control with embodiments of the mixing structure that comprise an embossed structure, for example micro-sized random textures or micro-sized regular geometrical structures like lenslets, prisms, facets. Due to the rounded edges of the embossed structures and the absence of sharp transitions, such embossed structures typically involve less diffuse scattering, for example 10% or less, such as 3%.

For the degree of imaging of the light source in the projected beam the geometrical difference is length is measured, in the instant invention the Euclidian difference is used for this. The Euclidian difference is taken as the Euclidean distance, i.e. the straight line distance between two points in Euclidean space. Thereto, for the image of the light source in the projected light beam without added bluffing, the basic value of Euclidian difference for two (preferably most different) cross-sections is measured. Then over the same cross-sections the Euclidian difference is determined for the image of the light source in the projected light beam to which blurring is added, and then divided by said basic value resulting in a normalized value for Euclidian difference. If this normalized value is below a chosen, desired threshold value, for example in the present case below 10%, the imaging of the light source is considered to sufficiently absent or considered invisible.

Depending on the desired beam properties of the lighting device, the light source and the material of the lens can be chosen. The light source preferably is a LED or, a plurality of LEDs (for example, white, RGBW, or RGBA) as these are relatively cheap and enable low voltage applications and emit light as a hemisphere only into a forward direction. However, alternatively a compact HID lamp or halogen lamp can be used as the light source.

The lens can, for example, be a refractive aspheric, spherical, hyperbolic, convex-concave, plano-convex, or double convex lens. A positive lens generally redirects, converges and/or collimates light into a relatively narrow beam. Chromatic aberrations are caused by differences in refraction index for different wavelengths. The lens material can, for example be selected from soft glass, hard glass, quartz glass, or a polymeric material like PMMA, polycarbonate or polyethylene, though other (co)polymers may also be possible. Glass lenses generally can somewhat better withstand high temperatures, for example caused by the light source, but, on the other hand synthetic lenses are somewhat lighter (in weight) than glass lenses.

The table below gives the relation between refractive index and the wavelength for some suitable lens materials:

| Wavelength λ | Silicone | PMMA | Silica Glass (SiO2) |
| --- | --- | --- | --- |
| 400 nm | 1.417 | 1.499 | 1.47012 |
| 500 nm | 1.410 | 1.490 | 1.46233 |
| 600 nm | 1.404 | 1.485 | 1.45804 |
| 700 nm | 1.401 | 1.482 | 1.45529 |
| 800 nm | 1.407 | 1.487 | 1.45332 |

As mentioned before, if the light source (LED) is close to or in the focal point of the lens, an image of the light source will be projected on the projecting surface, for example a wall or an illuminated object. Although this image is not very sharp, it is not the smooth uniform rotationally symmetric beam that is preferred. An embodiment of the lighting device is characterized in that the bluffing strength FWHM is in the range of 4.5° to 10°. A blurring strength FWHM>=4.5° renders the lighting device to issue a beam in which effectively the imaging of the light source on the projecting surface is obviated, i.e. the normalized value of the Euclidian difference of the imaged light source in the projected beam is less than 10%. A blurring strength FWHM<=10° renders the lighting device to issue a beam with a relatively sharp cut-off, i.e. the outer contour edge of the projected beam is observed as relatively sharp while a relatively narrow beam can be maintained.

An embodiment of the lighting device is characterized in that the mixing structure is provided in between the light source and the lens. As said before, the mixing structure involves the conflicting phenomena of increasing the vagueness and beam broadening, and hence an appropriate setting for these two conflicting phenomena has to be chosen. Though a lighting device with a mixing structure provided on the exit surface of the lens is a suitable embodiment of the invention, it appears that a mixing structure provided at a position before light from the light source enters the bulk of the lens (upstream of the lens), i.e. which is positioned at the entry surface of the lens or is positioned in between the light source and the lens, renders in general a better balance between said two conflicting phenomena than providing the mixing structure at the exit surface of the lens or after the lens (downstream of the lens). In other words, a small blurring before or on the entrance surface of the lens smoothens out the beam without significant adding to/increasing the FWHM beam width.

An embodiment of the lighting device is characterized in that the mixing structure is provided on a separate carrier. This is a relatively simple solution as the step of providing the mixing structure on the lens itself is avoided. Furthermore, positioning of the mixing structure in a desired position, either upstream of downstream of the lens, is simply enabled. Also replacement of a first mixing structure by a second, different mixing structure is relatively simple and cheap.

An embodiment of the lighting device is characterized in that the mixing structure is provided on a light entry surface of the lens facing the light source. Thus the number of required parts for the lighting device is reduced, rendering a simpler construction of the lighting device.

An embodiment of the lighting device is characterized in that the mixing structure is in one part which renders a relatively simple construction of the lighting device compared to alternative mixing structures provided in two parts, i.e. on entrance and exit surface of the lens, or which is provided in three parts, i.e. on a separate carrier and entrance and exit surface of the lens. Said alternatives, however, offer ample possibilities for fine-tuning the balance between the two conflicting phenomena of the desired vagueness and undesired beam broadening.

An embodiment of the lighting device is characterized in that the mixing structure has at least one micro-sized texture chosen from the group consisting of facets, concave or convex lenslets, prisms, prismatic ridges, gas inclusions, frosted surface, sand-blasted surface, etched surface, powder inclusions. Micro-sized means a size in the range from 1 μm, i.e. at least well longer than the wavelength of visible light, to about 5000 μm, but preferably to 1000 μm or less as a relatively fine structure renders ample fine-tuning possibilities for the blurring. Random blurring structures like gas inclusions, frosted surface, sand-blasted surface, etched surface, solid and/or liquid inclusions having a different refractive index from the material in which they are embedded, are suitable for obtaining the desired vagueness increase while preserving a relatively narrow beam. Alternatively, geometrical structures, for example, a texture of lenslets or prisms, can be used to achieve said desired effect. The advantage of geometrical structures in comparison with random structures is that the optical function can be controlled better with geometrical structures than with random structures. On the other hand random structures may in some cases be easier to produce.

The plurality of lenslets can comprise convex and/or concave lenslets. The optimal optical power of these lenses can be found by measuring the Euclidian difference, as explained earlier. An embodiment of the lighting device is characterized in that the mixing structure is embodied as a regular, geometrical structure, for example as a tessellated surface of triangles, squares, rectangles, hexagons or a combination of octagons with squares. An advantage of regular structures is that it is easier to design the mixing structure with the right mixing properties. Examples of geometries are:

Domes, added to light entrance surface, placed for example in a trigonal configuration;

Domes, subtracted from the light entrance surface, placed for example in a hexagonal configuration;

Parabolic bumps or dents, placed for example in a square configuration;

Cylinders or cones, added to the light entrance surface in a star-shaped configuration. This will mainly compensate for the imaging of a non-circular source, with a limited effect on beam width but also a reduced effect on compensation for chromatic aberrations. This may have an advantage in case the non-circularity of the source is more disturbing than color aberrations;

Toruses, added to the light entrance surface in a concentric configuration. This will mainly have impact on color aberrations and less on non-circularity. The effect of beam spread will be larger.

The degree of blurring by the mixing structure can be varied via a number of parameters of the micro-sized elements thereof, such as for example the density and/or size of gas inclusions, particle inclusions, or embossed texture profiles, the (spread in) angle of prism structures, the diameter and the radius of lenslets. Additionally, the index of refraction of the material of the mixing structure can be used to vary said degree of blurring or any other structuring, forming and/or faceting of the surface of the mixing structure can be used to vary said degree of blurring. The crucial property of all of these surfaces is their function to slightly increase vagueness and/or broaden the incoming beam of light at each position of the lens surface.

An embodiment of the lighting device is characterized in that the lens is an aspheric lens. An aspherical refractive lens as such reduces optical aberrations but has a somewhat more complex surface profile than a normal convex refractive lens. A convex refractive lens renders the lighting device to be relatively efficient, as there is relatively little Fresnel reflection because of light entering and exiting the refractive material relatively perpendicular to its outer surface.

An embodiment of the lighting device is characterized in that the lens has diameter $D_L$ and the light source has a diameter $D_{LS}$, wherein $D_L/D_{LS}>=6$, preferably $D_L/D_{LS}>=8$. For $D_L/D_{LS}>=6$ the light source then has a relatively small size compared to the lens that it can more or less be considered a point-like light source and imaging of the light source in the projected beam can be sufficiently be avoided. When the DL/DLS>=8 even better results are obtained as imaging of the light source in the projected beam can essentially be completely made invisible to humans. This invention can be used for a variety of light sources as known from use in spot luminaires, for example halogen lamps, high pressure gas discharge lamps (HID) and LED. The advantage of an LED is that it usually starts with a Lambertian emission pattern of about 120° FWHM which allows more efficient incoupling than with omnidirectional sources like halogen lamps and HID. In the case of omnidirectional light sources a specular mirror directly behind the light source would help to improve the efficiency. Larger light sources such as (compact) fluorescent lamps or OLEDs are not preferred because of their large etendue.

The invention further relates to a lens provided with a mixing structure having a bluffing strength FWHM, with FWHM being in a range of 3° to 15°, the bluffing strength of the mixing structure gradually and continuously increases with an increase in distance R in a radial direction from the optical axis. Such a lens is not only applicable in a lighting device according to the invention, but also suitable for a lighting device with a fixed lens, i.e. a lens not moveable with respect to the light source, and wherein the beam width is controlled via diaphragms.

The invention further relates to a method to obtain a desired or required quality of a light beam, the method comprises the steps of:
 select a light source for generating a primary light beam;
 select for a secondary light beam at least one desired or required threshold value of at least one of color aberration and geometric difference;
 provide a mixing structure for transformation of the primary light beam into the secondary light beam, said mixing structure is provided on an optical axis and has a bluffing strength FWHM, with FWHM being in a range of 3° to 15°, the blurring strength of the mixing structure gradually and continuously increases with an increase in distance in a radial direction R from the optical axis;
 vary the transformation of the light beam by variation in bluffing strength of the mixing structure to determine the minimum added bluffing by which said at least one desired or required threshold value for the secondary light beam is obtained.

A convenient way to assess the transformation of the light beam and to arrive at the desired or required threshold value via a minimal value of blurring is to plot the obtained value as function of the added scattering. The amount of the added bluffing at which the plot becomes lower than the threshold value is the minimal added bluffing. A possible measure for the geometric difference is the Euclidian difference.

In the method a lens might be added to provide for a more collimated secondary light beam. However, the presence of a lens is of influence on the imaging of the light source in the secondary beam and hence the blurring properties of the mixing structure for providing the added bluffing likely have to be adjusted accordingly.

BRIEF DESCRIPTION OF THE DRAWINGS

The invention will now be further elucidated by means of the schematic drawings, in which.

DETAILED DESCRIPTION OF THE PREFERRED EMBODIMENTS

Figure 1:
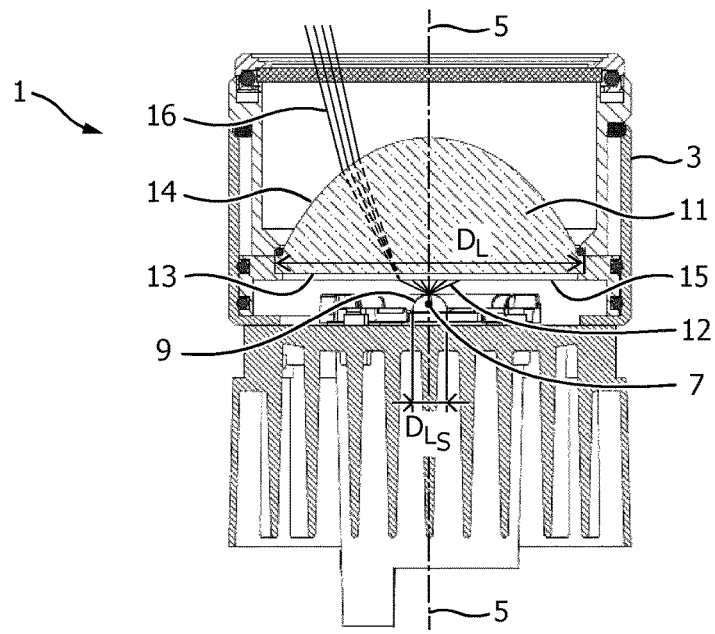
FIG. 1 shows a cross-section of a first embodiment of a lighting device according to the invention.

FIG. 1 shows a cross-section of a first embodiment of a lighting device 1 according to the invention. The lighting device comprises a housing 3 centrally arranged around an optical axis 5 and accommodates a light source 7 centrally mounted on the optical axis. The light source in the figure is a LED comprising a dome 9 with a diameter $D_{LS}$ of about 1 cm, the LED issuing a primary light beam 12. The housing further comprises a glass lens 11, i.e. LIBA 2000, centrally mounted on the optical axis and having a lens diameter $D_L$ of about 7 cm and being moveable with respect to light source along and/or over the optical axis. The lens has a light entry surface 13 and a light exit surface 14, the light entry surface is provided with a mixing structure 15 having a bluffing strength of about 4.5° FWHM, the bluffing having a Gaussian distribution. The lighting device issues a secondary light beam 16.

Figure 2:
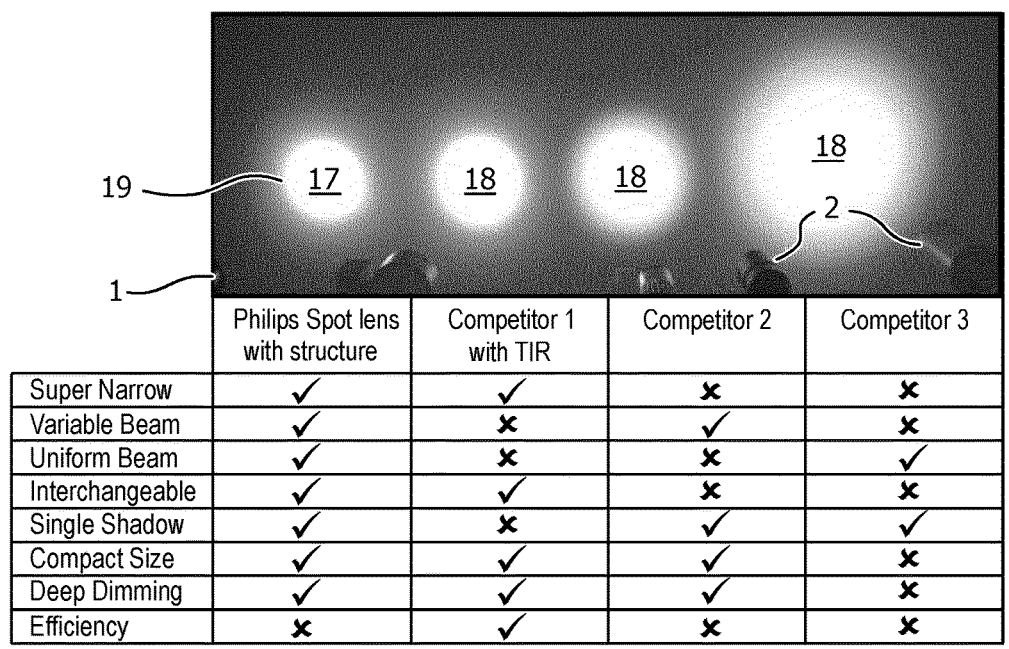
FIG. 2 shows beam spots and properties of beams as obtained by known lighting devices and according to the lighting device of FIG. 1.

FIG. 2 gives an impression of beam spots of and properties of secondary beams as obtained by three known lighting devices 2 and a beam 18 as obtained from a lighting device 1 according to the embodiment of the invention of FIG. 1. As shown, a relatively narrow beam spot 17 for the secondary light beam is obtainable with the lighting device of the invention, said secondary light beam being both variable and uniform and having a sharp cut-off at beam edge 19. The lighting device according to the invention in general outperforms all the known lighting devices and only, because of the feature of a variable beam, has a somewhat less efficiency than the lighting device using TIR collimator. Said optical efficiency is relatively low when a TIR lens is not used, because some light from the Lambertian LED-source will not enter the lens, but it will be absorbed in the housing, while a TIR lens essentially captures all light but does not enable a variable beam and hence does not meet the object of the invention. Light not directly entering the lens may be reflected instead of absorbed to increase optical efficiency, but this will enhance the risk of broadening the beam.

Figure 3A:
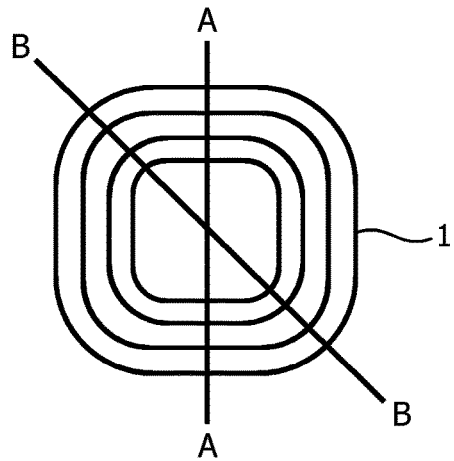
FIGS. 3A-B shows the relationship of imaging of a LED light source by a lens in relation to added blurring by the mixing structure.
Figure 3B:
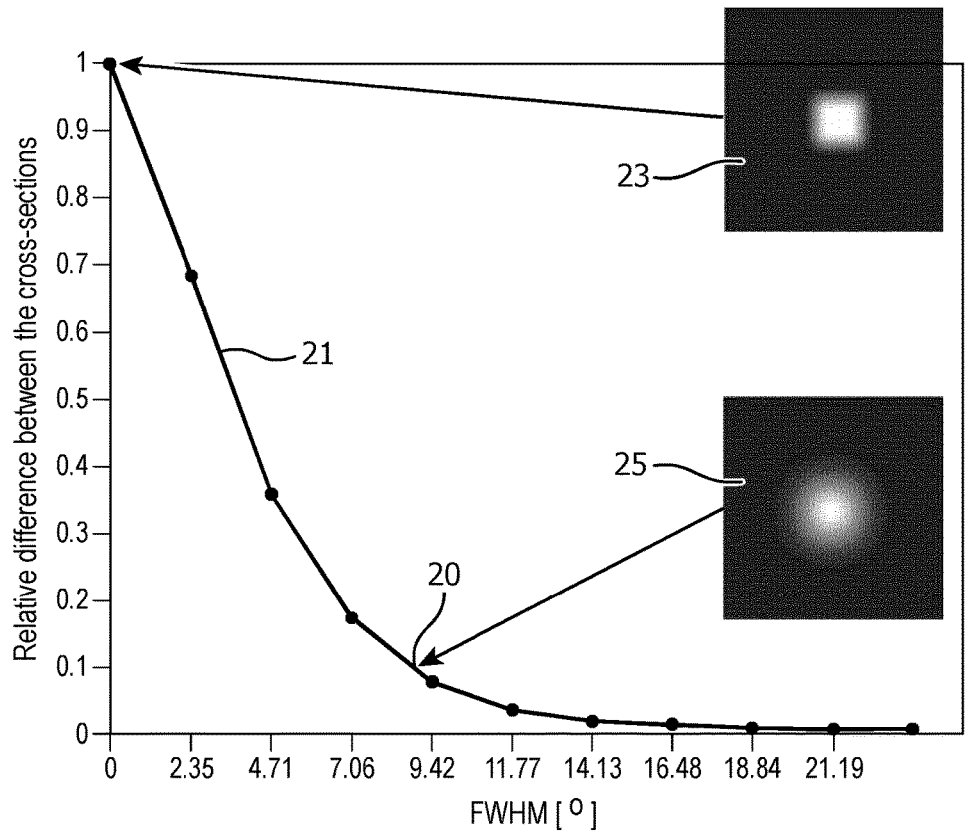

FIGS. 3A-B show the relationship of imaging of a LED light source by a lens in relation to added scattering by the mixing structure. To counteract imaging and chromatic aberration, the bluffing strength of the entrance surface of the lens is increased until the vagueness has increased to such an extent that there is no image visible anymore in the beam. The visibility is defined as the relative difference between intensity cross-sections over A-A and diagonal B-B of a theoretical square LED light source 1. The difference between these cross-sections is defined as the Euclidian difference between the vectors. The difference between these cross-sections can be defined in many ways, but here the Euclidian distance is used. Yet, the visibility of the image is always proportional to the difference, independent from the definition. The difference in the case of image formation without any bluffing is normalized to 1, hence FIG. 3B shows the relative difference in Euclidian distance. As shown by curve 21 in FIG. 3B of the relationship of imaging by the lens of a LED light source in relation to added bluffing by the mixing structure, when the bluffing strength increases, the image becomes vaguer and thus the difference between the cross-sections decreases, i.e. the intensity profile approaches a circle. An image formation which is at a threshold value of 10% of the full visibility, in the figure at point 20, is defined as absence of image formation. From the curve, in this particular case for the theoretical square LED light source, the bluffing strength in FWHM is about 9° for the absence of imaging in the projected beam. In the case of a real source, which is closer to a round shape a milder bluffing would be sufficient, in general for round light sources an added bluffing strength of about 4° is sufficient to counteract imaging adequately. Please note that other threshold values may be used as well, for example at 20% or at 5% of the full visibility, depending on the application requirements, and can be defined by user tests. The images, as projected onto a wall are shown for the case of no bluffing 23 and with an image 25 with an added bluffing of about 9° FWHM. A similar model can be used to define the minimum requirement of the bluffing structure to reduce/remove the visible effect of chromatic aberrations, see FIGS. 6A-B.

Figure 4A:
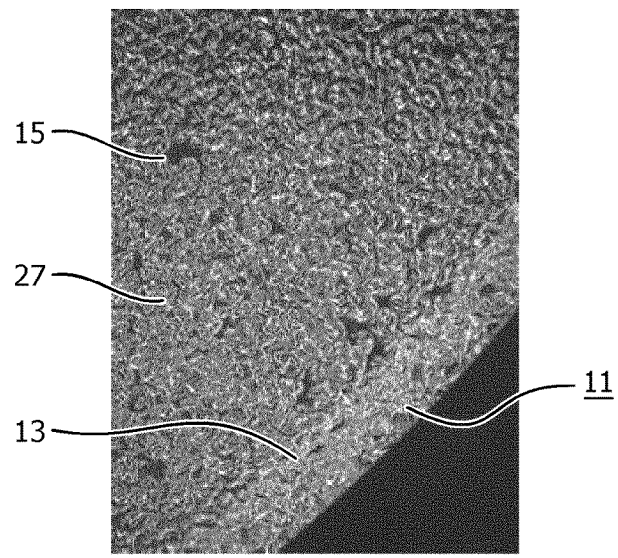
FIGS. 4A-B shows a first example of a mixing structure according to the invention provided on an entry surface of a lens.
Figure 4B:
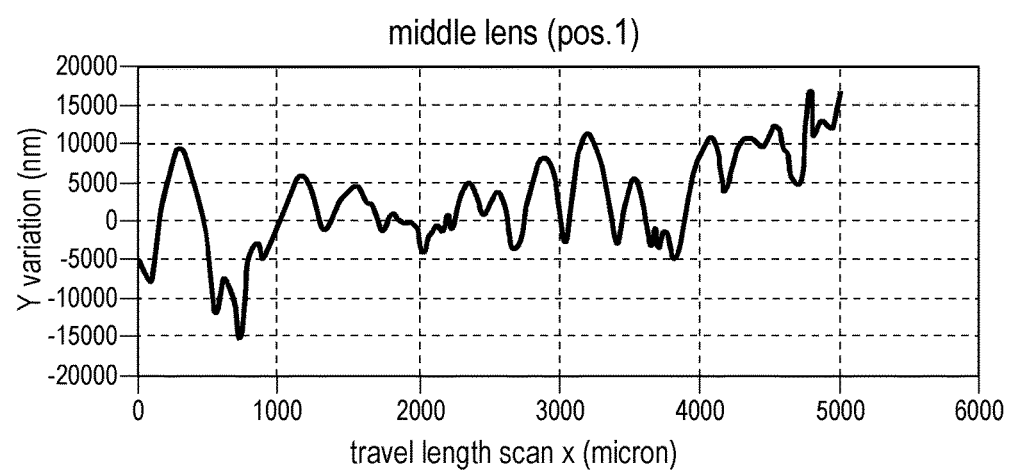

FIG. 4A shows a first example of a random mixing structure 15 according to the invention provided on an entry surface 13 of a glass lens 11. The entry surface has a typical texture 27 which renders the lens to have controlled blurring properties, in the FIG. 4A an added blurring in FWHM of around 4.5°. The random mixing structure has a texture comprising irregular undulations which varies in diameter/size from a few tenths of micrometers to a couple of hundreds of micrometers and in height from about one micrometer to about twenty micrometers. The lens with mixing structure is made by pressing the hot glass of the lens in a mold, where the (mirror) texture is on the plano side of the mold. Other methods to make a surface structure could be used as well, for example by using gas inclusions or powder inclusions, or treat the surface of the transparent lens or carrier with an etching agent, or with sand-blasting. Alternatively a textured mixing structure can be obtained by a texture of lenslets or prisms to achieve the same desired bluffing effect. FIG. 4B shows the profile for a part of the texture as provided on the lens measured by a step profiler.

Figure 5A:
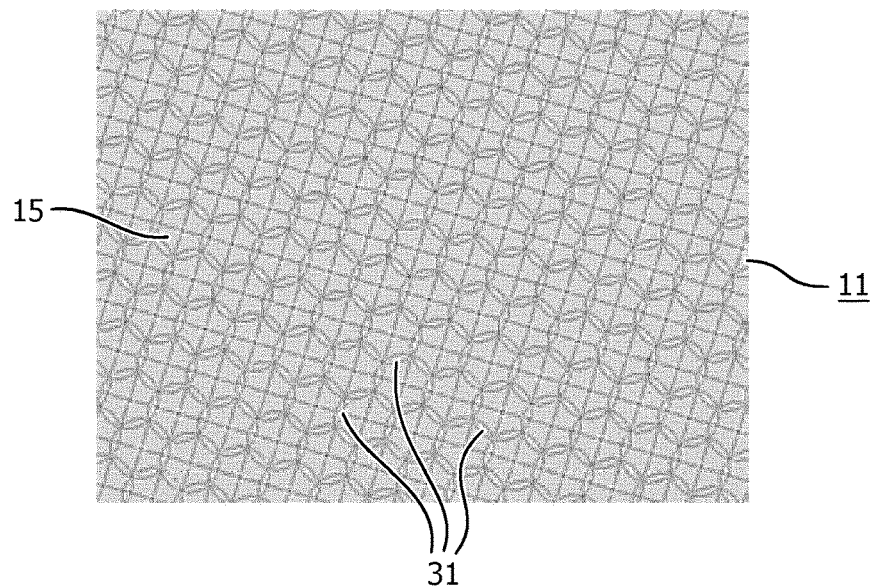
FIGS. 5A-B show a second example of a mixing structure according to the invention and simulation results of imaging in relation to variation in the mixing structure.
Figure 5B:
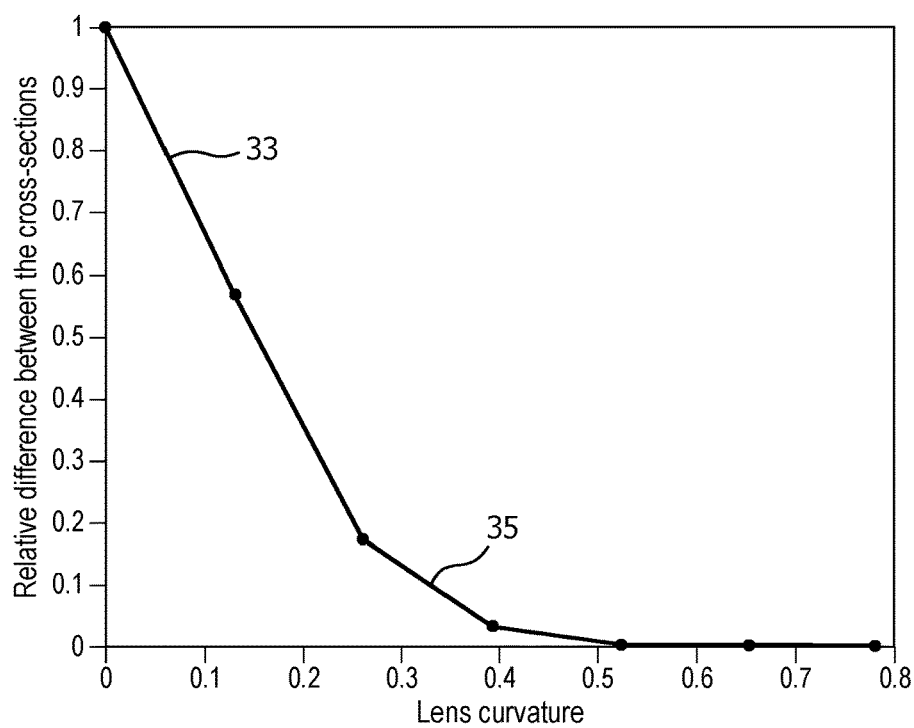

FIGS. 5A-B show a second example of a mixing structure 15 according to the invention comprising a tessellated surface of hexagonally arranged lenslets 31 on a lens 11 and simulation results of imaging in relation to lenslet curvature (FIG. 5B). The texture of said mixing structure of hexagonally arranged lenslets is shown in FIG. 5A. The effect of said regular structure of convex hexagonally arranged spherical lenslets is simulated in the same way as with the random structure, and the visibility of the image of the light source is set at 100% when the mixing structure is absent. For this example diameter of 0.9 mm is used for each a lenslet provided on an entry surface of a PMMA lens. This is just an example, other suitable material and any diameter of 1 mm or less can be used as long as it is not too small for production or too close to the wavelength of the light, i.e. when the diameter is at least 1 µm. The lenslets are spherical caps of 0.9 mm with a lens radius of the curvature of about 3 mm and are placed in a hexagonal arrangement, as shown in the FIG. 5A. A number of simulations is done for a range of different lens curvature radius, while maintaining the number of lenslets and the (projected) diameter of 0.9 mm of the lenslets. The result is plotted in the FIG. 5B. The graph 33 shows that the visibility of the image of the LED is reduced to 10% at point 35, hence considered to be no longer visible, with a lens radius of about 3 mm and a (projected) diameter of 0.9 mm.

Figure 6A:
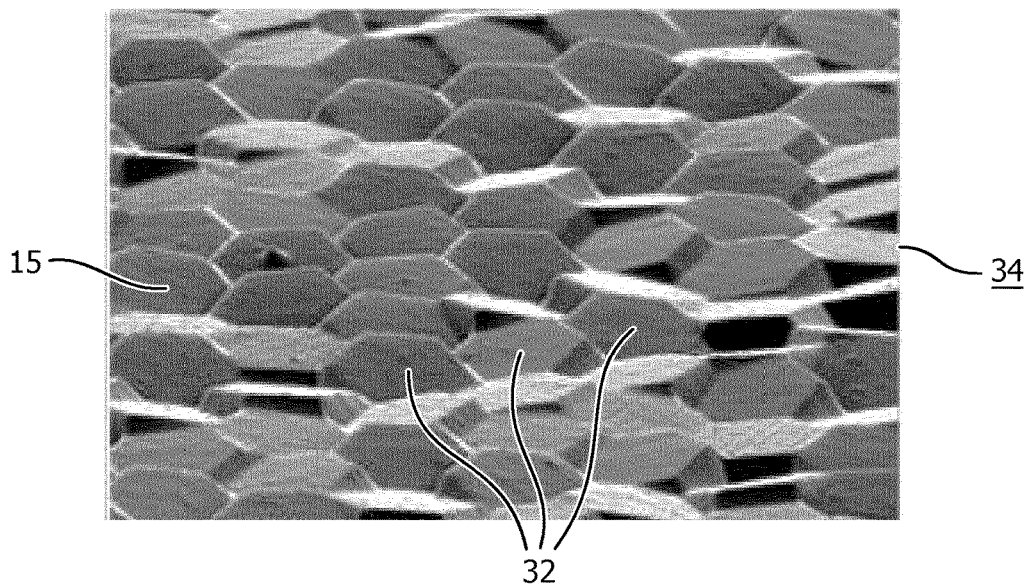
FIGS. 6A-B show a third example of a mixing structure according to the invention and simulation results of imaging in relation to variation in the mixing structure.
Figure 6B:
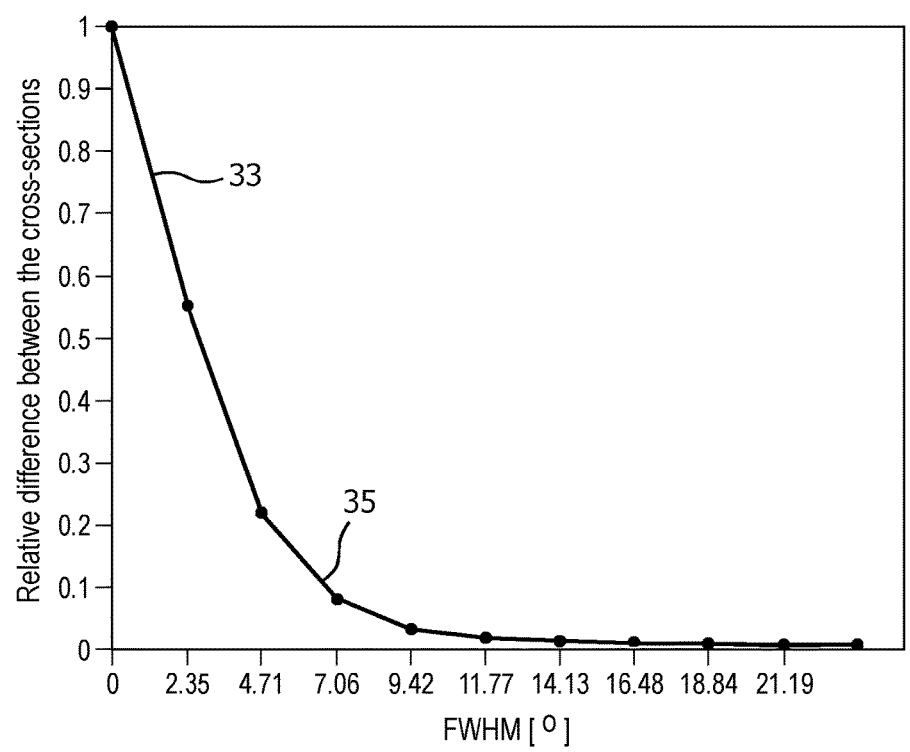

Similar simulations have been done for a third embodiment of the mixing structure 15 having a faceted surface with hexagonal facets 32 with a size of about 100 µm in diameter, as shown in FIG. 6A. Said third embodiment of the mixing structure is provided on an entry face of a 1 mm thick separate carrier 34, positioned between the light source and the lens at 3.6 mm upstream from the entry surface of the lens. The results of these simulations are shown in FIG. 6B by graph 33. By a variation in average orientation of the facet with respect to the main surface of the plane of the carrier, referred to as "facet tilt", with said main surface oriented about perpendicular to the optical axis, the blurring strength of the mixing structure is varied, this is done up to about 20° facet tilt. If the average facet tilt is more than about 7°, i.e. from point 35 onwards, the imaging of the light source is less than 10%. The results are shown for a mixing structure which has a faceted surface of randomly distributed facets, though it appeared from the simulations that other distributions can also be used (depending on what shape of this spreading beam one wants to achieve) and that for small angles of the facet tilt (up to 20°) the exact angular distribution of the facets does not play a role, i.e. an even distribution can be used as well.

Figure 7A:
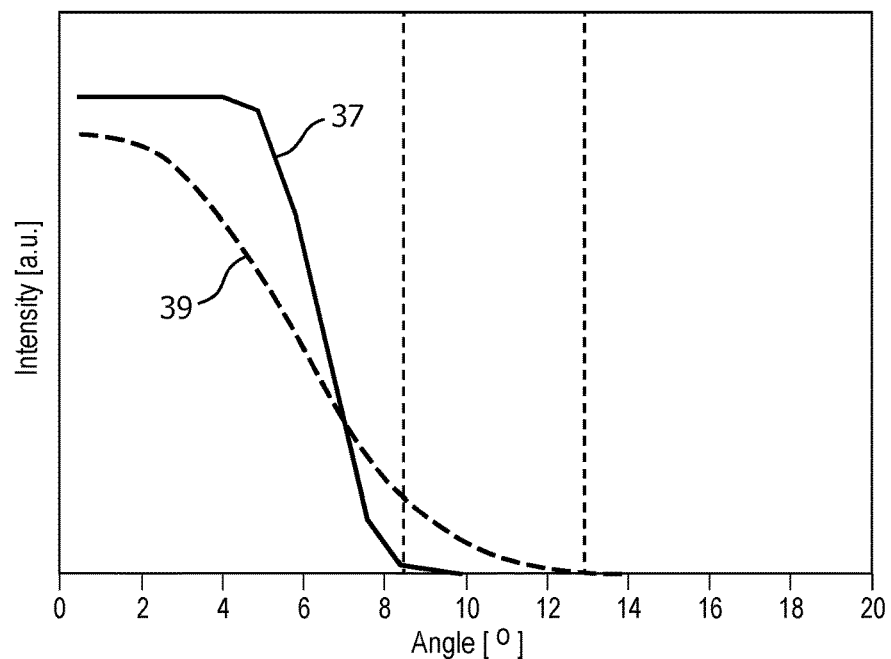
FIG. 7A shows the luminous intensity profile and FIG. 7B shows the color difference du'v' of a cross section of a beam with FWHM=13°, respectively without and with added blurring.
Figure 7B:
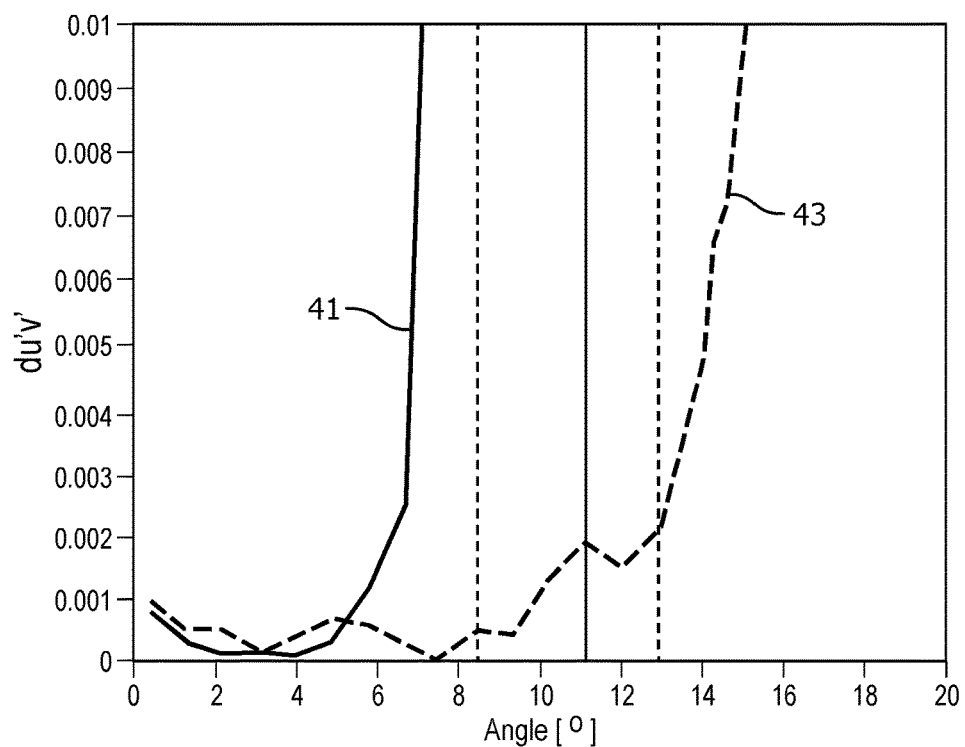

FIGS. 7A-B show the intensity profile (FIG. 7A) without added blurring 37 and with added bluffing of 4.23° FWHM 39 of a half beam having a Gaussian distribution and color difference du'v' (FIG. 7B) of a cross section of a beam with FWHM=13°, without added bluffing 41 and with added bluffing of 8.5° FWHM 43 having a Gaussian distribution. The mixing structure is used to minimize color artefacts caused by chromatic aberration and other artefacts as well, e.g. imaging. The required blurring strength depends on a number of parameter, such as material, lens geometry, source geometry and distance from source to lens. The required mixing structure can be determined by simulation using the method described below.

For simulation of the effect of a mixing structure a 12 mm diameter round source is used and du'v' is used for defining the color difference. The reference is the u'v' weighted average. The Energy Star™ norm for color artefacts for spot lighting requires that du'v'<=0.005 is within 10% of the maximum intensity, though different applications may have different requirements. In a very demanding application, such as museum lighting, du'v'<=0.005 within 1% of the maximum intensity could apply.

In the simulation an added bluffing of 8.5° FWHM with a Gaussian distribution provided at the entrance surface of the lens is applied. The graphs in FIG. 7A show the linear intensity distribution in relation to the angle within the beam. The solid line is the intensity distribution without bluffing, the dotted line shows the light intensity distribution of the same lens with the abovementioned mixing structure. The graphs plotted in FIG. 7A show that the blurring smoothens out the sharpness of the beam i.e. with about 8°, but the effect on the FWHM beam width is very limited, i.e. about only 2°, i.e. the graphs in FIG. 7A shows that a small (Gaussian) blurring on the entrance surface of the lens smoothens out the beam without adding to the FWHM beam width. Sharpness of the beam can be described as the angular space in which the intensity decreases from 90% of the maximum intensity to 10% of the maximum intensity. If the angular space is small, the beam is sharp. FIG. 7A shows that in the light beam without added blurring by the structure mixing the intensity decreases from 90% to 10% in a small angular space, i.e. from 90% at about 5° to 10% at about 7.5°. FIG. 7A shows as well that in the light beam with added blurring by the mixing structure the light distribution is following a curve that is essentially a Gaussian distribution, and that the angular space in which the intensity decreases from 90% to 10% is in this case much larger, i.e. from 90% at about 3° to 10% at about 9°. Hence, the beam with added blurring is less sharp, but yet still sharper than is obtained by a comparable combination of a light source and a reflector.

The graphs in FIG. 7B show du'v' in relation to the angle within the beam. The solid line shows a large increase in du'v' in the area between 6° and 7°, where the intensity is still high, i.e. the graphs in FIG. 7A shows that the intensity in said area is up to roughly 40% of the maximum intensity. This is not according to the Energy star norm and not acceptable in demanding applications. Contrary to this, the dotted line in FIG. 7B shows du'v' is around 0.002 at an intensity of 1% of the maximum intensity, which is the result of the blurring effect caused by the mixing structure. The lighting device according to the invention has the characteristics of the dotted lines for intensity distribution and color difference du'v', and meets the specifications Energy Star™ norm mentioned earlier. Moreover, blurring could even be a bit less for the chromatic aberration to be acceptable, rendering the intensity profile of the beam even to be somewhat better. The optimum can be defined by simulation in a trial- and error process. Preferably the desired amount of beam spreading is the larger of the required two minimal values for absence of color aberration and absence of imaging as then both criteria are fulfilled and yet any additional, unnecessary spread that may broaden the beam width without any visible benefit is avoided.

If the FWHM blurring on the entrance surface of the lens is larger than the FWHM of the beam angle without blurring structure, it will result in an increased FWHM beam width. This brings the conclusion that the maximum spread in FWHM is equal to the beam width in FWHM of same lens geometry without blurring structures. In the case this is not giving a sufficient result, due to parameters of the reference system that cannot be changed, the larger beam should be accepted.

Figure 8A:
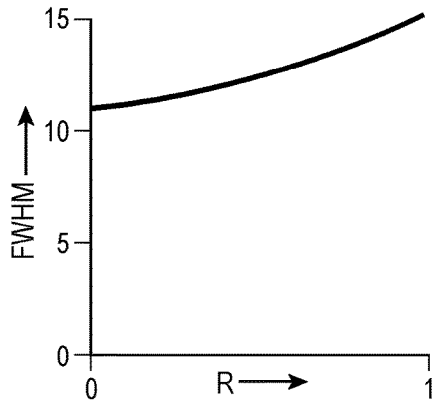
FIG. 8A-F show examples of blurring strengths as a function of radial distance from the optical axis.
Figure 8B:
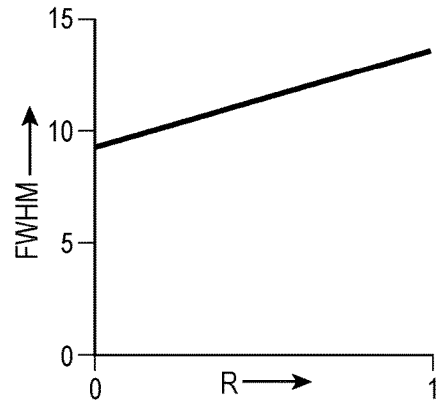
Figure 8C:
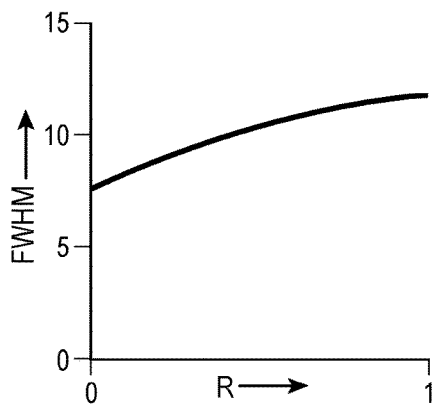
Figure 8D:
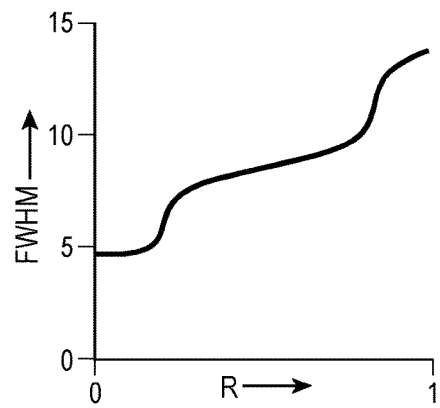
Figure 8E:
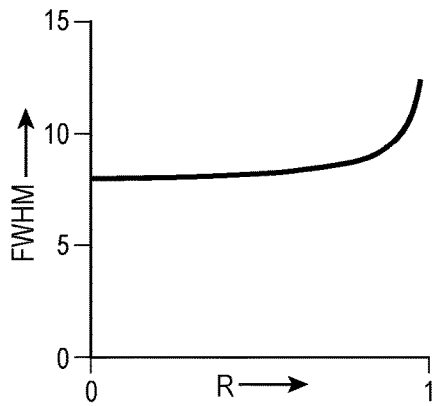
Figure 8F:
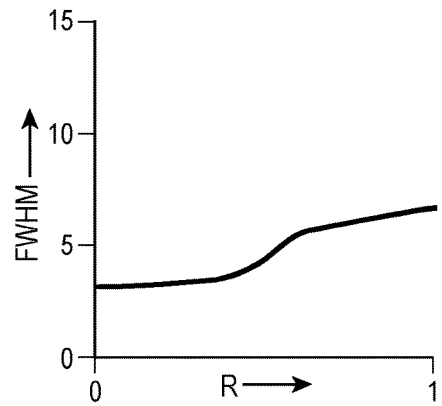

FIG. 8A-F show examples of blurring strengths FWHM as a function of radial distance from the optical axis. As shown the blurring strength may vary according to various profiles in radial direction R. The blurring strength FWHM might increase gradually with a small, constant gradient (FIG. 8B), or with a small somewhat increasing (FIG. 8A) or somewhat decreasing gradient (FIG. 8C), or with a sudden steep increase in gradient (FIG. 8E). The blurring strength may stepwise, but continuously and gradually increase having a single step (FIG. 8E) or multiple steps (FIG. 8F). As shown in most cases the blurring strength FWHM of the mixing structure increases in the radial direction R from the optical axis by at least a factor 1.1, preferably by at least a factor 1.6, in FIG. 8D said factor is about 2.8. It is evident that FIG. 8A-F just show examples and that other gradients can be envisaged.

The invention claimed is:

1. A lighting device for issuing a light beam in a main direction along an optical axis, the lighting device comprising:
   a light source;
   a positive, refractive lens provided on the optical axis, the lens being movable with respect to the light source along the optical axis; and
   a mixing structure provided on the optical axis and having a blurring strength FWHM, with FWHM being in a range of 3° to 15°, the blurring strength of the mixing structure gradually and continuously increases with an increase in distance R in a radial direction from the optical axis.

2. A lighting device according to claim 1, characterized in that the blurring strength of the mixing structure increases in the radial direction R from the optical axis by at least a factor 1.1.

3. A lighting device according to claim 1, characterized in that the blurring strength FWHM is in the range of 4.5° to 10°.

4. A lighting device according to claim 1, characterized in that the blurring has a distribution according to a Gaussian profile.

5. A lighting device according to claim 1, characterized in that the mixing structure is provided in between the light source and the lens.

6. A lighting device according to claim 5, characterized in that the mixing structure is provided on a separate carrier.

7. A lighting device according to claim 1, characterized in that the mixing structure is provided on a light entry surface of the lens facing the light source.

8. A lighting device according to claim 1, characterized in that the mixing structure is in one part.

9. A lighting device according to claim 1, characterized in that the mixing structure has at least one micro-sized texture chosen from the group consisting of facets, concave or convex lenslets, prisms, prismatic ridges, gas inclusions, frosted surface, sand-blasted surface, etched surface, liquid inclusions, solid inclusions.

10. A lighting device according to claim 1, characterized in that the mixing structure is embodied as a geometrical regular structure.

11. A lighting device according to claim 1, characterized in that the mixing structure is embodied as a random structure.

12. A lighting device according to claim 1, characterized in that lens is an aspherical lens.

13. A lighting device according to claim 1, characterized in that the lens has diameter $D_L$ and the light source has a diameter $D_{LS}$, wherein $D_L/D_{LS} >= 6$, preferably $D_L/D_{LS} >= 8$.

14. A lens comprising:
   a mixing structure having a blurring strength FWHM, with FWHM being in a range of 3° to 15°, the blurring strength of the mixing structure gradually and continuously increases with an increase in distance R in a radial direction from an optical axis.

15. A method to obtain a desired or required quality of a light beam, the method comprises the steps of:
   select a light source for generating a primary light beam;
   select for a secondary light beam at least one desired or required threshold value of at least one of color aberration and geometric difference;
   provide a mixing structure for transformation of the primary light beam into the secondary light beam, said mixing structure is provided on an optical axis and has a blurring strength FWHM, with FWHM being in a range of 3° to 15°, the blurring strength of the mixing structure gradually and continuously increases with an increase in distance R in a radial direction from the optical axis;
   vary the transformation of the light beam by variation in blurring strength of the mixing structure to determine a minimum added blurring by which said at least one desired or required threshold value for the secondary light beam is obtained.

* * * * *